(12) United States Patent
Barnes et al.

(10) Patent No.: US 9,561,142 B1
(45) Date of Patent: Feb. 7, 2017

(54) EXTERNAL CONDENSER AND LIGHT ASSEMBLY

(71) Applicant: REV Ambulance Group Orlando, Inc., Winter Park, FL (US)

(72) Inventors: Scott L. Barnes, Longwood, FL (US); Herschel W. Davis, Jr., Winter Springs, FL (US); Matthew W. Grafton, St. Cloud, FL (US); Robert L. Collins, Maitland, FL (US)

(73) Assignee: REV Ambulance Group Orlando, Inc., Winter Park, FL (US)

( * ) Notice: Subject to any disclaimer, the term of this patent is extended or adjusted under 35 U.S.C. 154(b) by 0 days.

(21) Appl. No.: 15/291,830

(22) Filed: Oct. 12, 2016

Related U.S. Application Data

(63) Continuation of application No. 14/531,047, filed on Nov. 3, 2014, which is a continuation of application No. 13/217,568, filed on Aug. 25, 2011, now Pat. No. 8,899,059.

(60) Provisional application No. 61/377,335, filed on Aug. 26, 2010.

(51) Int. Cl.
| | |
|---|---|
| *B60P 3/20* | (2006.01) |
| *B60Q 1/24* | (2006.01) |
| *A61G 3/00* | (2006.01) |
| *B60H 1/00* | (2006.01) |
| *B60H 1/32* | (2006.01) |
| *B60Q 1/26* | (2006.01) |

(52) U.S. Cl.
CPC ........... *A61G 3/008* (2013.01); *B60H 1/00414* (2013.01); *B60H 1/00521* (2013.01); *B60H 1/3229* (2013.01); *B60Q 1/2611* (2013.01); *B60Q 1/2661* (2013.01)

(58) Field of Classification Search
CPC ........ B60P 3/20; F25D 19/003; B60H 1/3232; B60H 1/00371; B60H 2001/00235; B60H 1/323; B60H 1/0414; B60H 1/00457; B60H 1/00828; B60Q 1/2611; B60Q 1/24; B60Q 1/245; B60Q 1/2607; B60Q 1/0041
USPC .......... 62/239, 244, 263, 428; 362/493, 544, 362/547; 296/19
See application file for complete search history.

(56) References Cited

U.S. PATENT DOCUMENTS

| | | |
|---|---|---|
| 2,263,476 A | 11/1941 | Sunday |
| 2,775,184 A | 12/1956 | Pipes |
| 4,018,472 A | 4/1977 | Mason, Jr. |

(Continued)

OTHER PUBLICATIONS

Pictures provided by third party dated Jul. 15, 2004; Jun. 15, 2005; Jun. 16, 2005; and Dec. 13, 2006; 3 pages.

*Primary Examiner* — Frantz Jules
*Assistant Examiner* — Meraj A Shaikh
(74) *Attorney, Agent, or Firm* — Hovey Williams LLP

(57) ABSTRACT

The present invention relates generally to an external condenser and light assembly and, more particularly, to an improved external air conditioning condenser and housing that is designed to additionally serve as a light assembly for an emergency vehicle. The condenser housing is mounted to the exterior of the emergency vehicle, which improves the performance of the emergency vehicle's air-conditioning system. The design of the condenser housing also allows it to serve as a light assembly on which emergency vehicle lights are mounted. The condenser housing and light assembly structure thereby provides for proper air conditioning functionality without occupying space on the exterior of the vehicle that would more preferably be occupied by emergency lighting.

24 Claims, 5 Drawing Sheets

(56) References Cited

U.S. PATENT DOCUMENTS

| | | | | |
|---|---|---|---|---|
| 4,310,192 | A | * | 1/1982 | Fitzgerald ............ B62D 35/001 296/180.4 |
| 4,366,530 | A | | 12/1982 | Milhous |
| 4,558,635 | A | | 12/1985 | Dick |
| 4,823,238 | A | | 4/1989 | Bauer et al. |
| 5,220,808 | A | * | 6/1993 | Mayer ................ B60H 1/00371 62/244 |
| 5,222,373 | A | * | 6/1993 | Waldschmidt ..... B60H 1/00014 62/239 |
| D381,953 | S | * | 8/1997 | Collins ........................ D12/401 |
| 5,716,269 | A | * | 2/1998 | Garbooshian ...... B60H 1/00414 454/139 |
| 5,743,631 | A | * | 4/1998 | Bigham .................. B60S 1/603 362/294 |
| 5,878,592 | A | * | 3/1999 | Borges ................. B60H 1/3232 62/239 |
| 6,374,626 | B1 | * | 4/2002 | Takahashi ............ B60H 1/3232 62/239 |
| 6,543,240 | B2 | | 4/2003 | Grafton |
| 8,210,725 | B2 | | 7/2012 | Datz et al. |
| 2006/0137886 | A1 | * | 6/2006 | Cano ...................... A62C 27/00 169/24 |
| 2007/0007053 | A1 | * | 1/2007 | Abel ........................ B60P 1/14 180/53.5 |

* cited by examiner

EXTERNAL CONDENSER AND LIGHT ASSEMBLY

RELATED APPLICATIONS

This application is a continuation of co-pending U.S. patent application Ser. No. 14/531,047, filed Nov. 3, 2014, entitled "EXTERNAL CONDENSER AND LIGHT ASSEMBLY," which is a continuation of U.S. Pat. No. 8,899,059, issued Dec. 2, 2014, entitled "EXTERNAL CONDENSER AND LIGHT ASSEMBLY," which claims priority benefit of U.S. Provisional Patent Application Ser. No. 61/377,335, filed Aug. 26, 2010, entitled "EXTERNAL CONDENSER AND LIGHT ASSEMBLY," the entire disclosures of all applications are incorporated herein by reference.

BACKGROUND

1. Field of the Invention

Various embodiments of the present invention concern external automotive air-conditioning condensers. More particularly, certain embodiments concern external automotive condenser and light assemblies for emergency vehicles.

2. Description of the Related Art

The present invention relates generally to an external condenser and light assembly and, more particularly, to a new external air conditioning condenser and housing which is designed to additionally serve as a light assembly for an emergency vehicle. The condenser housing is mounted to the exterior of the emergency vehicle, which improves the performance of the emergency vehicle's air conditioning system. The design of the condenser housing also allows it to serve as a light assembly on which emergency vehicle lights are mounted. The condenser housing and light assembly structure thereby provides for proper air conditioning functionality without occupying space on the exterior of the vehicle which would more preferably be occupied by emergency lighting.

The most effective air conditioning solution available for an emergency vehicle is to include in the air conditioning system an external condenser. An external condenser provides for better air conditioner performance than would an internal condenser, and does so without taking up the limited internal space available in an emergency vehicle. Further, the most effective location for an external condenser is on the front exterior wall of the ambulance modular body. This mounting solution requires a series of support brackets to support the weight of the external condenser. However, while such a condenser mounting solution is the most operationally effective with regard to the vehicle's air conditioning system, it is not aesthetically pleasing to most ambulance customers. More importantly, ambulance users increasingly prefer to install several warning lights on the front face of the emergency vehicle's modular body, which is impossible on many emergency vehicles on which an external condenser is mounted. A condenser which is externally mounted via support brackets occupies space which customers would prefer to use for mounting warning lights.

As such, there is often insufficient room in the design of most modular emergency vehicles to install both an external air conditioning condenser and sufficient warning lights on the front of the modular body. Currently, customers of emergency vehicles have several options with regard to external condensers. First, they may choose to install the external condenser on the front of the emergency vehicle body and limit the size and number of warning lights. However, any reduction in the number of warning lights—especially on the front of an emergency vehicle—may be dangerous, as a reduced number of warning lights decreases the vehicle's ability to alert other motorists and pedestrians to its presence and mission. On the other hand, emergency vehicle customers may instead install the warning lights on the front of the emergency vehicle as they prefer, while installing the external condenser under the emergency vehicle body. However, when a condenser is mounted under an emergency vehicle, it is subject to road hazard damage and the excessive heat trapped under the vehicle's body due to engine exhaust. As such, placing the condenser under the body of an emergency vehicle severely limits the condenser's efficiency, and generally necessitates heightened maintenance requirements.

As such, a need exists for an external air conditioning condenser which is mountable at the front of the emergency vehicle body so as to operate effectively, but which does not reduce the already limited space available for warning lights. These and other specific advantages and features of the present invention will be apparent from the attached drawings and description of an illustrative embodiment of the present invention.

SUMMARY

One embodiment of the present invention concerns an external automotive condenser and light assembly comprising a condenser housing presenting an exterior front face and at least one warning light affixed to the exterior front face.

Another embodiment of the present invention concerns an external automotive air-conditioning condenser comprising a condenser housing having a top portion and a bottom portion, where each of the top portion and the bottom portion defines one or more openings configured to permit air to flow substantially vertically through the external automotive air-conditioning condenser.

Yet another embodiment of the present invention concerns an emergency vehicle comprising a vehicle body comprising a patient compartment and a driver compartment, where the driver compartment comprises a roof; and an air-conditioning system comprising an external condenser and light assembly coupled to the front of the patient compartment and spaced from the top of the driver compartment roof. In this embodiment, the external condenser and light assembly comprises one or more warning lights and a condenser housing presenting an exterior front face, where the exterior front face has at least one of the warning lights affixed thereto.

Still another embodiment of the present invention concerns a condenser and light assembly including: a condenser housing, the condenser housing having a top portion, a bottom portion, a left portion, a right portion, a front portion, and a back portion, where at least one of the top and bottom portions includes grating to allow airflow to pass through such portion, and where the back portion is mountable to the front of the patient compartment of an emergency vehicle above the emergency vehicle cab. In this embodiment, a condenser unit is housed within the condenser housing, where the condenser unit includes at least one condenser coil and at least one fan to create airflow across the condenser coil. Additionally, at least one warning light is mounted to a front face of at least one of the front, left, and right portions of the condenser housing, and a through-hole is defined in the condenser housing that is configured to allow at least one of condenser coil tubing, fan wiring, and warning light wiring to pass through the condenser housing.

BRIEF DESCRIPTION OF THE FIGURES

Embodiments of the present invention are described herein with reference to the following drawing figures, wherein.

DETAILED DESCRIPTION

Figure 1:
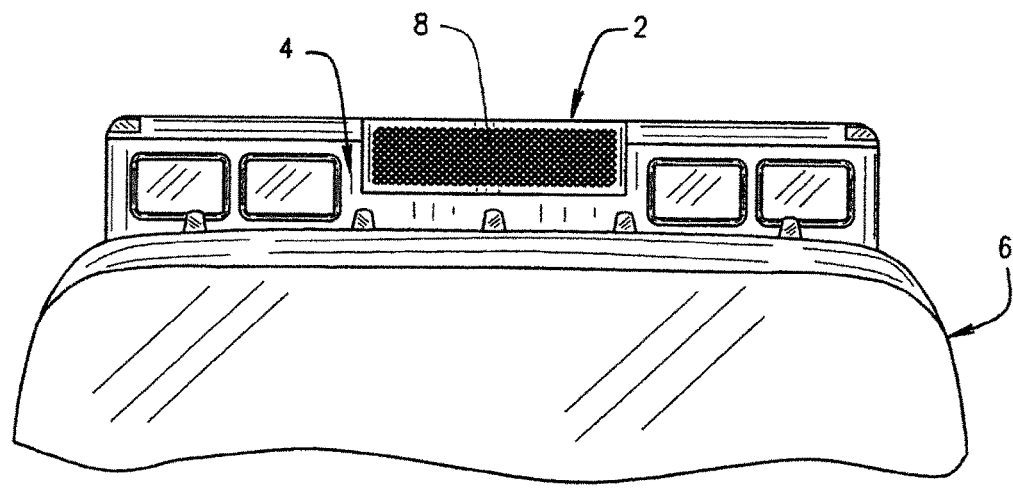
FIG. 1 is a front elevation view of a prior art external condenser mounted above the cab of an emergency vehicle.

As can be seen in FIG. 1, prior art external condensers 2 are often mounted on the front outside wall 4 of an emergency vehicle patient compartment, above the cab 6 (a.k.a., driver compartment). In order to achieve sufficient airflow through the condenser housing and across the condenser coils, the front of the condenser housing is comprised of a grating 8, as is standard in the art. As is shown in FIG. 1, the placement of the condenser 2 and condenser housing above the cab 6 at the front of the emergency vehicle patient compartment prevents the use of warning lights at that location. Though warning lights may be placed surrounding the condenser housing, any loss of light-mountable front-facing surface area may be dangerous, as discussed above.

Figure 2:
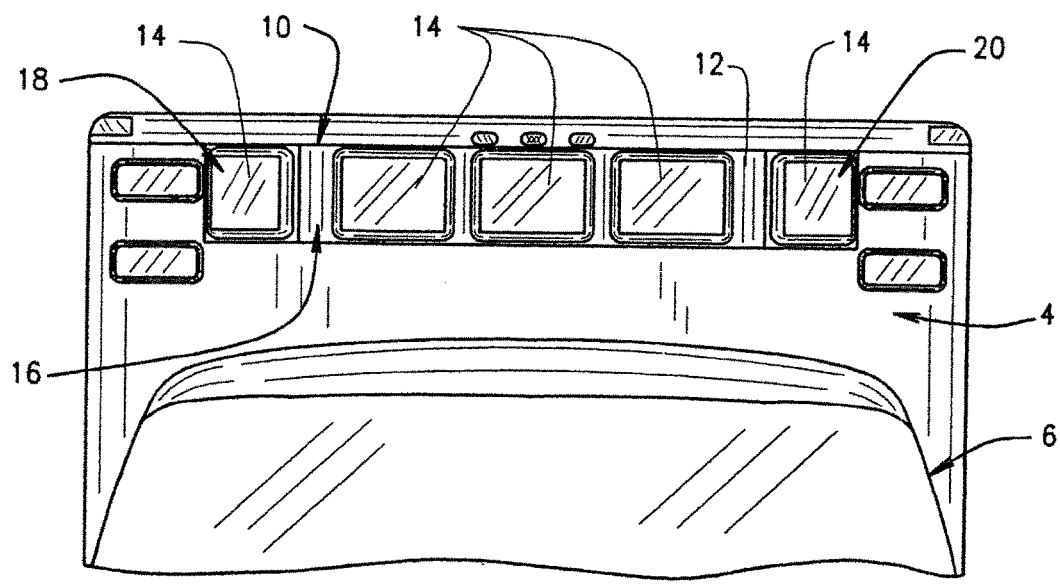
FIG. 2 is a front elevation view of an embodiment of an external condenser and light assembly installed above the cab of an emergency vehicle.

FIG. 2 illustrates a frontal view of an embodiment of the present external condenser and light assembly 10 installed above the cab 6 at the front wall 4 of the emergency vehicle patient compartment. In various embodiments, the external condenser and light assembly 10 can be spaced apart from the roof of the cab 6, as depicted in FIG. 2. The condenser housing 12 is elongate, stretching across much of the width of the emergency vehicle passenger compartment. The width and height of the condenser housing 12 are thereby sufficient to allow for the mounting of various warning lights 14 directly onto the front of the condenser housing 12. Additionally, as shown in FIG. 2, the condenser housing preferably has a front face which runs parallel to the front of the emergency vehicle patient compartment.

Figure 3:
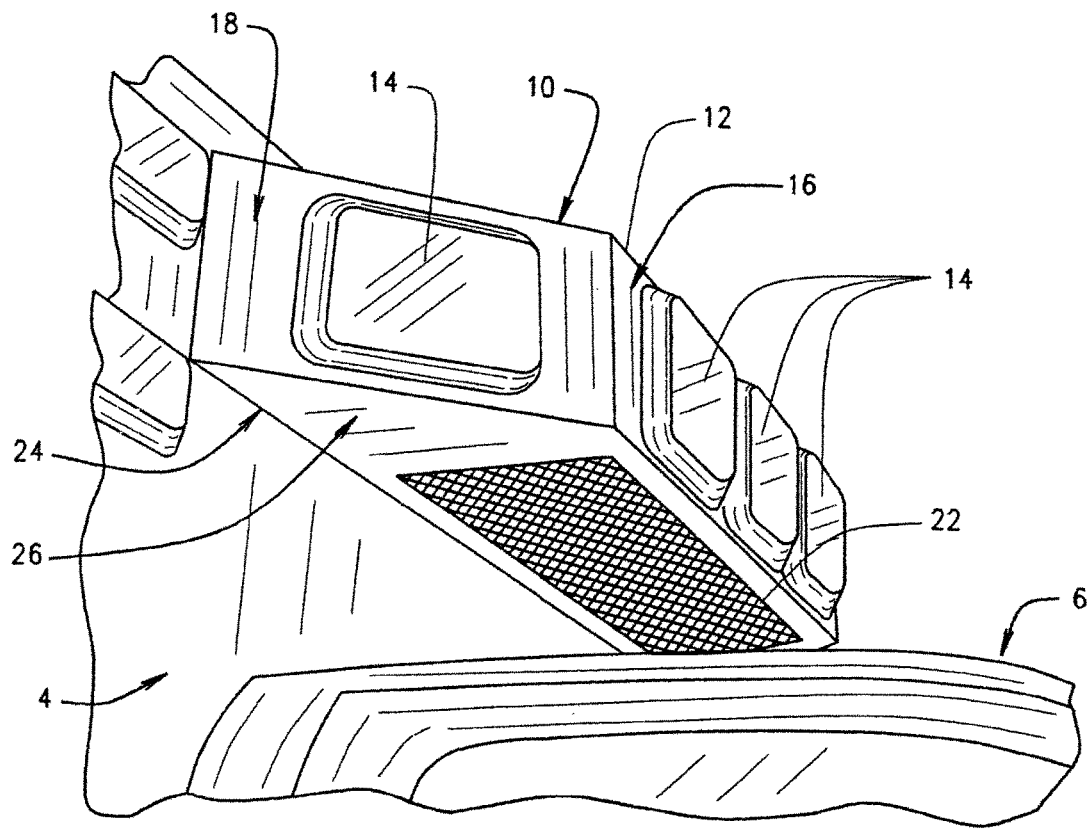
FIG. 3 is a bottom perspective view of one embodiment of an external condenser and light assembly installed above the cab of an emergency vehicle.

As is shown in FIG. 2 but which is more apparent in FIG. 3, the exterior left and right side faces 18, 20 of the condenser housing 12 angle inward as they extend away from the patient compartment at approximately forty-five degree angles. Conversely, the exterior right side face 18 and the exterior left side face 20 extend rearward from the exterior front face 16. The respective angles formed at the intersection between the exterior right face 18 and the exterior front face 16 and between the exterior left face 20 and the exterior front face 16 can be obtuse angles. In various embodiments, these angles can be in the range of from about 95 to about 165°, in the range of from about 110 to about 150°, or in the range of from 130 to 140°. This angling of the condenser housing exterior side faces 18, 20 not only provides for increased aerodynamics, but also provides an angled face onto which additional warning lights 14 may be mounted. Both FIGS. 2 and 3 illustrate large warning lights 14 mounted to the exterior front face 16 and exterior side faces 18, 20 of the condenser housing 12. Alternatively, many smaller lights or a light bar may be mounted in place of some or all of the larger warning lights 14. The angled warning lights 14 on the exterior side faces 18, 20 of the condenser housing 12 offer increased visibility and safety, as they can be seen by motorists and pedestrians in front of the vehicle as well as beside the vehicle. As such, turn signal indicators may preferably be mounted to the angled exterior side faces 18, 20 of the condenser housing 12. Such angled lights 14 are of particular importance when the emergency vehicle enters an intersection, as the emergency vehicle will likely approach oncoming cars and pedestrians on its front, left and right sides.

FIG. 3 further illustrates a bottom perspective view of an embodiment of the present external condenser and light assembly 10 installed above the cab 6 at the front of an emergency vehicle patient compartment. In various embodiments, the condenser housing 12 can define one or more openings configured to permit air to flow substantially vertically through the condenser housing 12. In certain embodiments, at least a portion of such openings can be defined by one or more gratings that can constitute at least a portion of the condenser housing 12, such as at the top and/or bottom of the condenser housing 12. For instance, as compared to the condenser housing 2 shown in FIG. 1, the present condenser housing 12 can utilize a bottom grating 22 instead of a front-facing grating 8. A downward-facing grating 22 allows the exterior front face 16 of the condenser housing 12 to be used as a mounting plate for warning lights 14, while still allowing for sufficient airflow through the condenser 10 and proper performance of the air-conditioning system. Although not depicted in FIG. 3, condenser housing 12 can also employ a top grating defining at least a portion of such openings to exhaust air from the external condenser and light assembly 10. The rear 24 of the condenser housing can be seen as mounted to the outside of the front wall 4 of the emergency vehicle patient compartment as will be discussed in detail below.

Figure 4A:
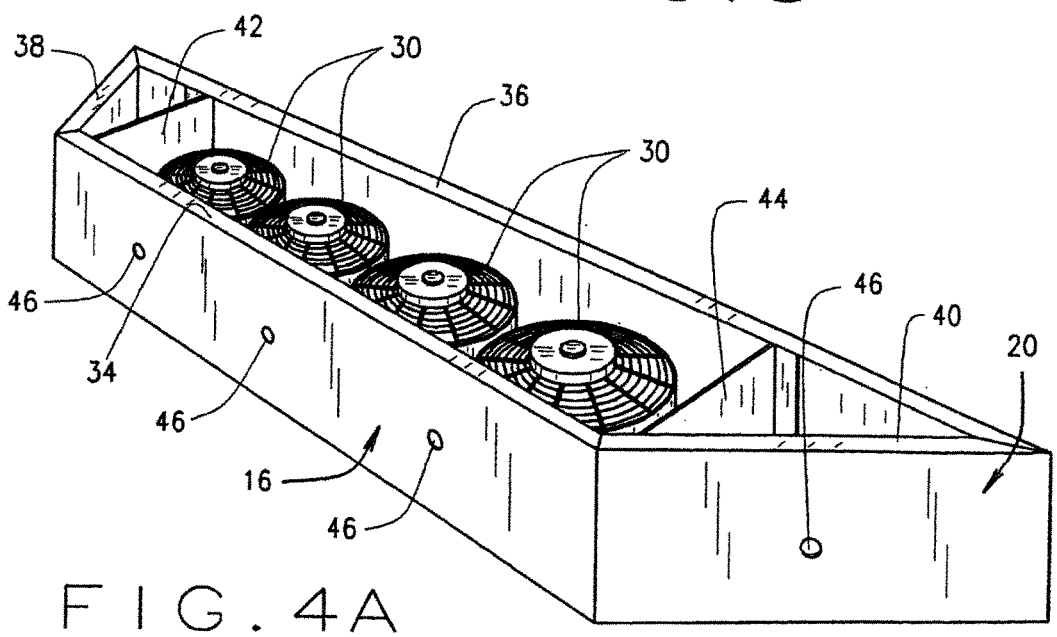
FIG. 4A is a perspective view of a condenser positioned within the present condenser housing with the condenser housing's top portion removed.
Figure 4B:
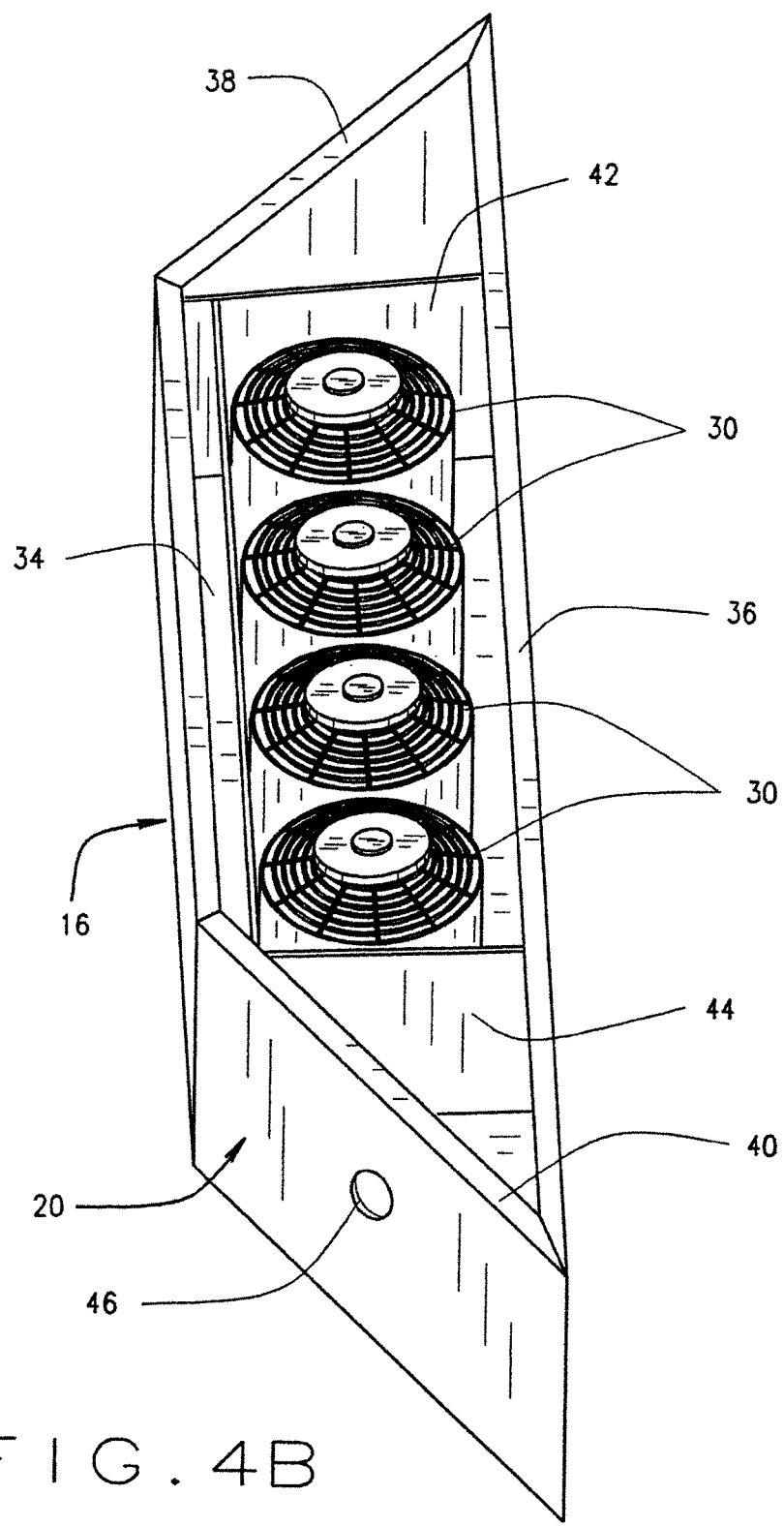
FIG. 4B is a side perspective view of a condenser positioned within the present condenser housing with the condenser housing's top portion removed.
Figure 6A:
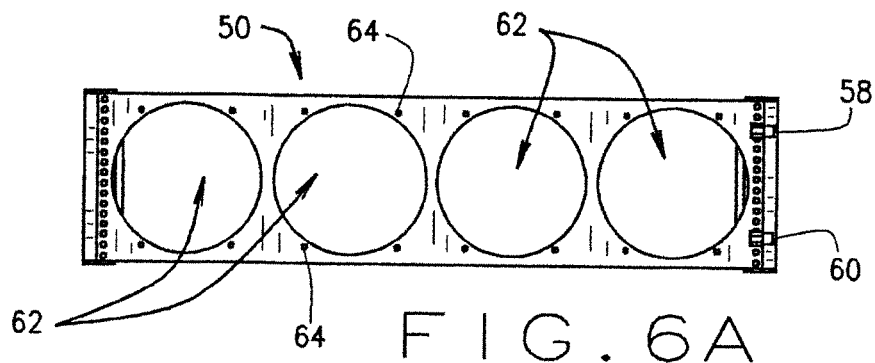
FIG. 6A is a plan view of one embodiment of the condenser mounting assembly.
Figure 6B:
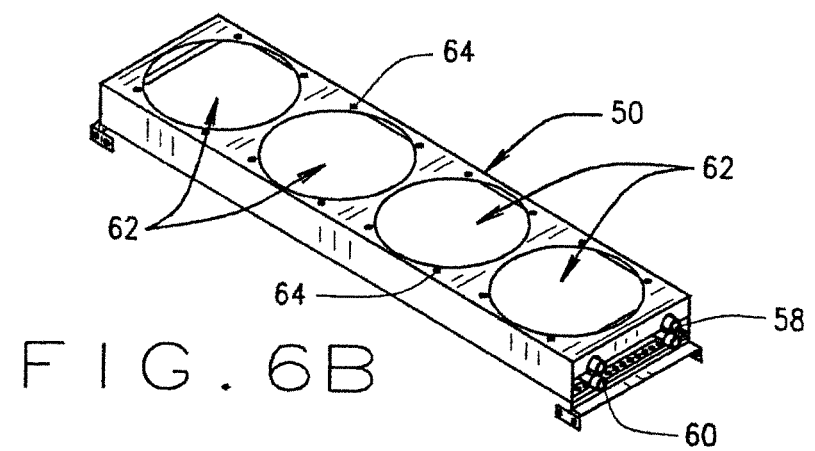
FIG. 6B is a perspective view of one embodiment of the condenser mounting assembly illustrated in FIG. 6A.
Figure 6C:
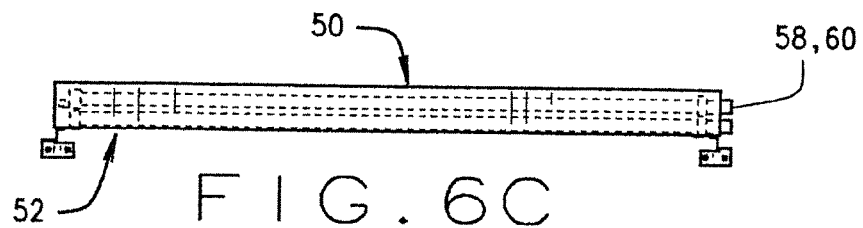
FIG. 6C is a front elevation view of one embodiment of the condenser mounting assembly illustrated in FIG. 6B.
Figure 6D:
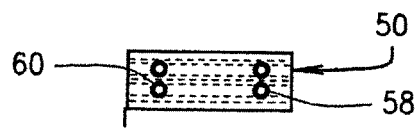
FIG. 6D is a side elevation view of one embodiment of the condenser mounting assembly illustrated in FIG. 6A-6C.
Figure 6E:
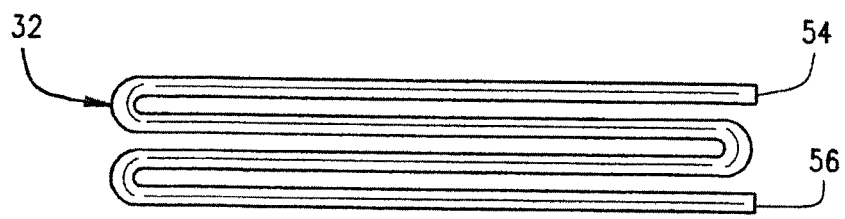
FIG. 6E is a plan view of an exemplary condenser coil.

FIGS. 4A and 4B illustrate an embodiment of the condenser housing 12 with its top portion 28 removed to allow for a better description of the internal structure of the condenser housing 12 and the condenser unit within. In various embodiments, the condenser housing 12 can include at least one condenser unit disposed therein. A condenser unit can include at least one condenser coil and at least one fan for creating airflow across the condenser coil. As shown in FIGS. 4A and 4B, the condenser unit includes fans 30 oriented to create airflow across the condenser coils 32 (FIG. 6E). While four fans 30 are illustrated, variations on the size and number of fans 30 are contemplated. Furthermore, the fans 30 may be oriented in either a downward or an upward configuration so as to correspondingly create either downward or upward airflow. Additionally, other devices which create airflow may be used rather than fans 30. Alternatively, though potentially not as efficient, the airflow created by the movement of the emergency vehicle could be relied upon such that no airflow-creating devices would be used.

Figure 5:
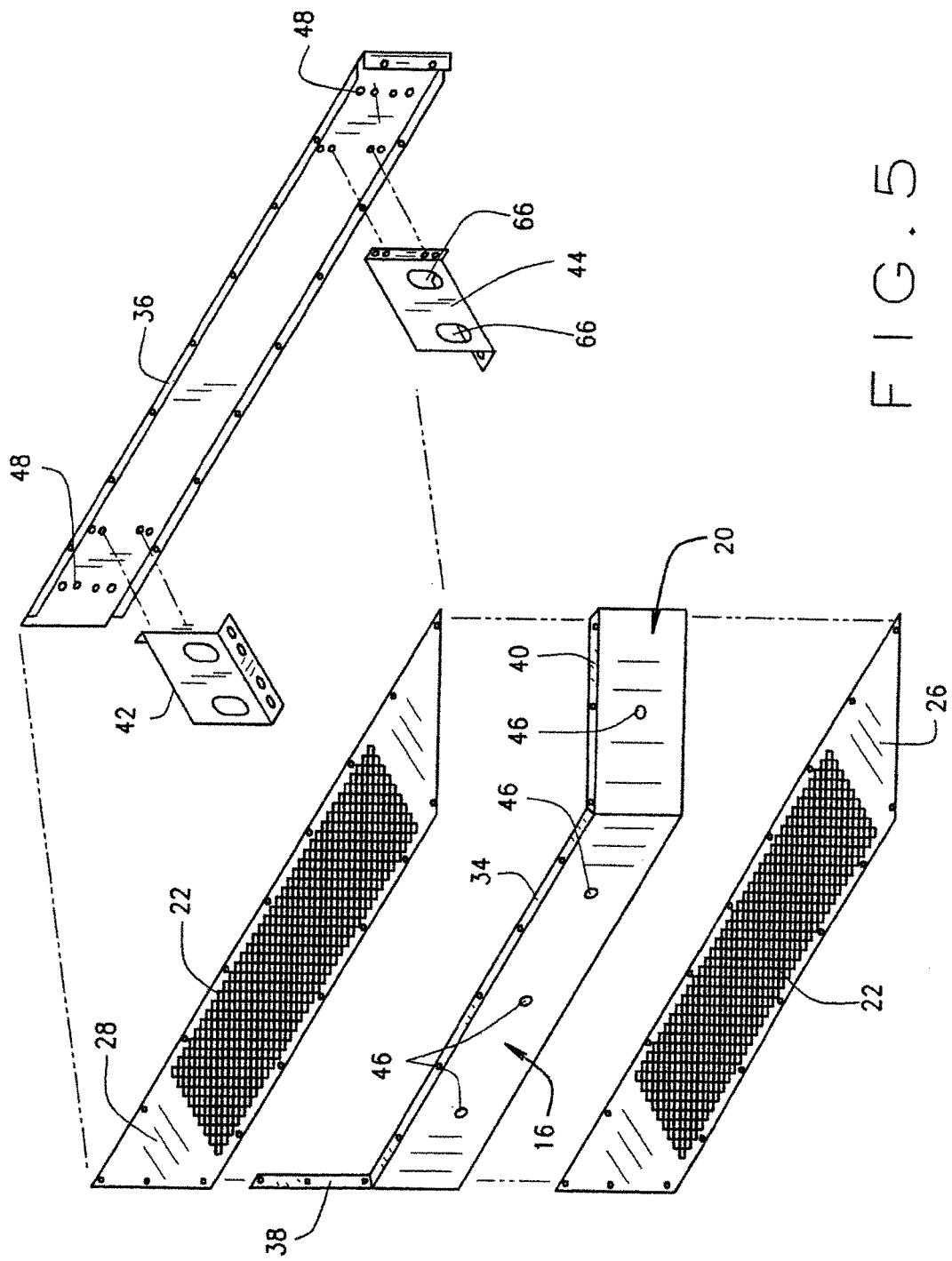
FIG. 5 is an exploded view of an exemplary condenser housing.

As can be seen in FIGS. 4A and 4B, the condenser housing 12 itself is generally an isosceles trapezoid in transverse cross section. As such, the front and back portions 34, 36 of the housing 12 are parallel to one another, with the back portion 36 being longer than the front portion 34. Further, the side portions 38, 40 have generally the same length as one another, with the base angle between each side portion 38, 40 and the back portion 36 being approximately forty five degrees. As will be discussed in detail below, a brace portion 42, 44 extends from each of the intersections between the front portion 34 and a side portion 38, 40 toward the back portion 36, and intersects the back portion 36 of the housing 12 perpendicularly. The two brace portions 42, 44, front portion 34, and back portion 36 form a transverse cross-sectional rectangle, with the two shorter parallel sides formed by the brace portions 42, 44 and the two longer parallel sides formed by the front and back portions 34, 36. The length of this rectangle is therefore approximately the length of the front portion 34 of the housing 12. FIG. 5 illustrates an exploded view of an embodiment of the condenser housing 12, showing the front and back portions 34, 36, the two angled side portions 38, 40, the bottom and top portions 26, 28 which preferably each include grating 22 for airflow, and the two brace portions 42, 44.

Several through-holes 46 are visible in the condenser housing of FIGS. 4A, 4B, and 5, which allow for wiring to pass through the condenser housing 12 to the warning lights 14 which would be mounted on the exterior front face 16 and exterior side faces 18, 20 of the condenser housing 12 during operation. Three such holes 46 are visible on the exterior front face 16 of the condenser housing 12 with another hole 46 on each exterior side face 18, 20, which correspond to the three large warning lights 14 of the exterior front face 16 and the single warning light 14 on each exterior side face 18, 20 illustrated in FIGS. 2 and 3. However, it is noted that other numbers, locations and sizes of these through-holes 46 are contemplated to best service the number, type and location of warning lights 14 selected by each individual user.

Additional through holes 48 are shown in FIG. 5 in the back portion 36 of the condenser housing 12 to allow air conditioning fittings for the external condenser and light assembly 10 and the wiring raceway for the fans 30 and warning lights 14 to pass directly from the condenser, fans, and warning lights through the condenser housing 12 into the body of the emergency vehicle for plumbing and electrical connection purposes. Mounting hardware and gaskets (not shown) are included to secure the device to the ambulance body.

FIGS. 6A through 6D illustrate an embodiment of a condenser mounting assembly 50 which is installed within the condenser housing 12, and more preferably within the above described rectangle created by the brace portions 42, 44 and the front and back portions 34, 36. The condenser mounting assembly 50 is preferably screwed, bolted, or otherwise connected to the front and back portions 34, 36 of the condenser housing 12, though it may be connected to the top 28, bottom 26, brace 42, 44 or side portions 38, 40. The exemplary condenser coils 32 shown in FIG. 6E are mounted to the underside 52 of the condenser mounting assembly 50 such that the inlet 54 and outlet 56 of the condenser coil 32 are connected to the inlet 58 and outlet ports 60 visible in FIGS. 6A-6D at one end of the condenser mounting assembly 50. It is noted that while the shape of the condenser coils 32 shown in FIG. 6E have been narrowed and elongated to fit within the condenser housing 12, other shapes and sizes of condenser coils 32 are envisioned, as well as other types of condenser units. The condenser coils 32 may include so-called "fins" as are known in the art to increase the surface area in contact with the airflow.

The condenser mounting assembly 50 shown in FIGS. 6A and 6B includes four circular holes 62 sized and positioned to receive and/or allow the above discussed fans 30 to create airflow across the condenser coils 32 mounted below. The fans 30 are preferably mounted to the condenser mounting assembly 50 via the smaller screw holes 64 surrounding each of the four larger holes 62. It is noted that FIGS. 6A-6D illustrate the condenser coils 32 as being mounted below the condenser mounting assembly 50, with fans 30 positioned on top of condenser mounting assembly 50 so as to draw airflow up through condenser coils 32. However, condenser coils 32 may be positioned on top of the condenser mounting assembly 50 with fans 30 positioned below to blow airflow up through condenser coils 32. This may be accomplished by mounting the condenser mounting assembly 50 shown in FIGS. 6A-6D upside-down within the condenser housing 12, or via an alternate structure of the condenser mounting assembly 50 to position the condenser coils 32 above the fans 30, as would be understood in the art. In still other embodiments, fans 30 can be positioned above condenser coils 32 and configured to blow airflow down through condenser coils 32.

As discussed above, the wiring for the fans 30 within the condenser housing 12 and for the warning lights 14 mounted to the outer faces of the condenser housing 16, 18, 20, as well as tubing connected to the inlet and outlet ports 58, 60 of the condenser mounting assembly 50, pass from the condenser housing 12 into the vehicle front wall 4 through one or more holes in the back portion 36 of the condenser housing 12 and through corresponding holes in the front wall 4 of the emergency vehicle patient compartment. In the embodiment shown in FIGS. 4 through 6, the inlet and outlet ports 58, 60 of the condenser mounting assembly 50 are located adjacent to one of the brace portions 44 when the condenser mounting assembly 50 is installed within the condenser housing 12. In such an embodiment, tubing which is connected to the inlet and outlet ports 58, 60 of the condenser mounting assembly 50 must pass through a hole 66 (shown in FIG. 5) in the adjacent brace portion 44 before it has sufficient room to turn toward the back portion 36 and pass into the front wall 4 of the emergency vehicle's patient compartment. The wiring for the fans 30 and warning lights 14 may then follow the tubing through the brace portion 44 and into the vehicle patient compartment, or may enter the vehicle through a different hole. Alternatively, a condenser coil 32 with a different design may necessitate inlet and outlet ports 58, 60 located elsewhere on the condenser mounting assembly 50. It is envisioned that in such an embodiment, the tubing connected to the inlet and outlet ports 58, 60 may pass from the condenser housing 12 into the emergency vehicle at some other point.

The external condenser and light assembly 10 may house the only condenser unit on the emergency vehicle, or it may be connected in series with a standard condenser as would normally be found in the engine of a vehicle. In either case, the condenser unit of the external condenser and light assembly 10 would assist in properly cooling the cab 6 (a.k.a., driver compartment) and the patient compartment, supplementing the work done by the internal condenser. Alternatively, an independent air-conditioning system may serve the patient compartment apart from the system which serves the cab 6 of the emergency vehicle. In such an embodiment, the condenser unit of the external condenser and light assembly 10 would not be connected in series with an internal condenser, but would instead be connected to the patient compartment's independent air-conditioning system.

The preferred forms of the invention described above are to be used as illustration only, and should not be used in a limiting sense to interpret the scope of the present invention. Modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as it pertains to any apparatus not materially departing from but outside the literal scope of the invention as set forth in the following claims.

What is claimed is:

1. An external automotive condenser and light assembly for mounting on a patient compartment of an emergency vehicle, the condenser and light assembly comprising:
   a condenser housing configured to be mounted to a front wall of the patient compartment of the emergency vehicle, with said condenser housing including—
      a top portion defining at least one top opening and a bottom portion defining at least one bottom opening, wherein each of said top opening and said bottom opening is configured to permit air to flow from the top opening to the bottom opening or from the bottom opening to the top opening,
      a front side positioned forward of the front wall of the patient compartment and configured to face a direction of travel of the emergency vehicle, wherein said front side includes at least one warning light affixed to an exterior surface of said front side,
      a left side extending rearward from said front side to a position adjacent to the front wall of the patient compartment, wherein said left side includes at least one warning light affixed to an exterior surface of said left side,
      a right side extending rearward from said front side to a position adjacent to the front wall of the patient compartment, wherein said right side includes at least one warning light affixed to an exterior surface of said right side,
      wherein said left side and said right side each extend from said front side at an obtuse angle, with such obtuse angle being between 95° and 165°;
   at least one fan positioned within said condenser housing for causing air to flow from the top opening to the bottom opening or from the bottom opening to the top opening; and
   a condenser mounting assembly positioned within the condenser housing, wherein said condenser mounting assembly is operable to support said at least one fan.

2. The external automotive condenser and light assembly of claim 1, wherein said condenser housing further includes a back portion, wherein said back portion is configured to be mounted to the front wall of the patient compartment.

3. The external automotive condenser and light assembly of claim 2, wherein said back portion extends from said left side to said right side.

4. The external automotive condenser and light assembly of claim 1, wherein said front side is generally solid so as to allow the at least one warning light to be affixed thereto.

5. The external automotive condenser and light assembly of claim 1, wherein said top opening and said bottom opening are configured to permit air to flow substantially vertically through said external automotive condenser and light assembly.

6. The external automotive condenser and light assembly of claim 5, wherein said top portion and/or said bottom portion comprise one or more gratings defining at least a portion of said openings.

7. The external automotive condenser and light assembly of claim 1, further comprising at least one condenser unit disposed in said condenser mounting assembly, said condenser unit comprising at least one condenser coil, wherein said at least one fan is operable to create airflow across said condenser coil.

8. An emergency vehicle comprising the external automotive condenser and light assembly of claim 1, said emergency vehicle comprising:
   a vehicle body comprising the patient compartment and a driver compartment, wherein said driver compartment comprises a roof, wherein said external automotive condenser and light assembly is disposed above and spaced apart from a top of said driver compartment roof.

9. The emergency vehicle of claim 8, wherein said external automotive condenser and light assembly further comprises at least one component selected from the group consisting of condenser coil tubing, fan wiring, and warning light wiring, wherein each of said automotive condenser and light assembly and said patient compartment defines a through-hole allowing at least one of said condenser coil tubing, fan wiring, and warning light wiring to pass from within said condenser housing into said emergency vehicle.

10. An external automotive condenser and light assembly for mounting on a patient compartment of an emergency vehicle, the condenser and light assembly comprising:
   a condenser housing configured to be mounted to a front wall of the patient compartment of the emergency vehicle, with said condenser housing including—
      a top portion defining at least one top opening and a bottom portion defining at least one bottom opening, wherein each of said top opening and said bottom opening is configured to permit air to flow from the top opening to the bottom opening or from the bottom opening to the top opening,
      a front side positioned forward of the front wall of the patient compartment and configured to face a direction of travel of the emergency vehicle, wherein said front side includes at least one warning light affixed to an exterior surface of said front side, wherein said front side includes at least one through-hole extending through said front side,
      a left side extending rearward from said front side to a position adjacent to the front wall of the patient compartment, wherein said left side includes at least one warning light affixed to an exterior surface of said left side,
      a right side extending rearward from said front side to a position adjacent to the front wall of the patient compartment, wherein said right side includes at least one warning light affixed to an exterior surface of said right side,
      wherein said left side and said right side each extend from said front side at an obtuse angle, with such obtuse angle being between 95° and 165°; and
   at least one fan positioned within said condenser housing.

11. The external automotive condenser and light assembly of claim 10, wherein said condenser housing further includes a back portion, wherein said back portion is configured to be mounted to the front wall of the patient compartment.

12. The external automotive condenser and light assembly of claim 11, wherein said back portion extends from said left side to said right side.

13. The external automotive condenser and light assembly of claim 10, wherein said front side is generally solid so as to allow the at least one warning light to be affixed thereto.

14. The external automotive condenser and light assembly of claim 10, wherein said through-hole in said front side is configured to permit wiring to pass through the front side to the at least one warning light affixed thereto.

15. The external automotive condenser and light assembly of claim 10, wherein said top portion and/or said bottom portion comprise one or more gratings defining at least a portion of said top opening and said bottom opening.

16. An emergency vehicle comprising:
a vehicle body comprising a patient compartment and a driver compartment, wherein said driver compartment comprises a roof; and
an air-conditioning system comprising a condenser housing coupled to an exterior of a front wall of said patient compartment and spaced above said roof of said driver compartment, wherein said condenser housing includes—
a top portion defining at least one top opening and a bottom portion defining at least one bottom opening, wherein each of said top opening and said bottom opening is configured to permit air to flow from the top opening to the bottom opening or from the bottom opening to the top opening,
a front side positioned forward of said front wall of said patient compartment and configured to face a direction of travel of said emergency vehicle, wherein said front side includes at least one warning light affixed to an exterior surface of said front side,
a left side extending rearward from said front side to a position adjacent to said front wall of said patient compartment, wherein said left side includes at least one warning light affixed to an exterior surface of said left side,
a right side extending rearward from said front side to a position adjacent to the front wall of the patient compartment, wherein said right side includes at least one warning light affixed to an exterior surface of said right side,
wherein said left side and said right side each extend from said front side at an obtuse angle, with such obtuse angle being between 95° and 165°;
at least one fan positioned within said condenser housing for causing air to flow from the top opening to the bottom opening or from the bottom opening to the top opening; and
a condenser mounting assembly positioned within the condenser housing, wherein said condenser mounting assembly is operable to support said at least one fan.

17. The emergency vehicle of claim 16, wherein said condenser housing further includes a back portion, wherein said back portion is configured to be mounted to said front wall of said patient compartment.

18. The emergency vehicle of claim 17, wherein said back portion extends from said left side to said right side.

19. The emergency vehicle of claim 16, wherein said front side is generally solid so as to allow the at least one warning light to be affixed thereto.

20. The emergency vehicle of claim 16, wherein said top opening and said bottom opening are configured to permit air to flow substantially vertically through said air conditioning system.

21. An external automotive condenser and light assembly for mounting to a front wall of a patient compartment of an emergency vehicle, the condenser and light assembly comprising:
a front side positioned forward of the front wall of the patient compartment and configured to face a direction of travel of the emergency vehicle, wherein said front side includes at least one warning light affixed to an exterior surface of said front side, wherein said front side includes at least one through-hole extending through said front side;
a left side extending rearward from said front side to a position adjacent to the front wall of the patient compartment, wherein said left side includes at least one warning light affixed to an exterior surface of said left side, wherein said left side includes at least one through-hole extending through said left side;
a right side extending rearward from said front side to a position adjacent to the front wall of the patient compartment, wherein said right side includes at least one warning light affixed to an exterior surface of said right side, wherein said right side includes at least one through-hole extending through said right side,
wherein said left side and said right side each extend at an angle from said front side, with such angle being an obtuse angle;
a top opening and a bottom opening, wherein each of said top opening and said bottom opening is configured to permit air to flow through the condenser and light assembly from the top opening to the bottom opening or from the bottom opening to the top opening,
at least two fans positioned rearward of said front side and between said left side and said right side, wherein said at least two fans are configured to cause air to flow from the top opening to the bottom opening or from the bottom opening to the top opening; and
a condenser mounting assembly positioned rearward of said front side and between said left side and said right side, wherein said condenser mounting assembly is operable to support said at least two fans.

22. The external automotive condenser and light assembly of claim 21, further comprising a back portion, wherein said back portion is configured to be mounted to the front wall of the patient compartment.

23. The external automotive condenser and light assembly of claim 22, wherein said back portion extends from said left side to said right side.

24. The external automotive condenser and light assembly of claim 21, wherein said front side is generally solid so as to allow the at least one warning light to be affixed thereto.

* * * * *